(12) United States Patent
Duprez et al.

(10) Patent No.: US 7,017,564 B2
(45) Date of Patent: Mar. 28, 2006

(54) TEMPERATURE-CONTROLLED PCV VALVE

(75) Inventors: Wayne R. Duprez, Waltham, MA (US); Ken Zhao, West Roxbury, MA (US)

(73) Assignee: Standard-Thomson Corporation, Waltham, MA (US)

(*) Notice: Subject to any disclaimer, the term of this patent is extended or adjusted under 35 U.S.C. 154(b) by 0 days.

(21) Appl. No.: 11/047,842

(22) Filed: Feb. 1, 2005

(65) Prior Publication Data

US 2005/0188968 A1 Sep. 1, 2005

Related U.S. Application Data

(60) Provisional application No. 60/541,085, filed on Feb. 2, 2004.

(51) Int. Cl.
 *F02B 25/06* (2006.01)

(52) U.S. Cl. .................. 123/574; 137/468; 137/907

(58) Field of Classification Search ........ 123/572–574, 123/41.86; 92/468, 907
See application file for complete search history.

(56) References Cited

U.S. PATENT DOCUMENTS

| | | | |
|---|---|---|---|
| 3,263,660 A | 8/1966 | Hyde | |
| 3,359,960 A | 12/1967 | Pittsley | |
| 3,709,204 A | 1/1973 | Noponen | |
| 3,766,898 A * | 10/1973 | McMullen | 123/574 |
| 4,483,309 A | 11/1984 | Norman et al. | |
| 4,625,703 A * | 12/1986 | Otto et al. | 123/574 |
| 4,715,403 A | 12/1987 | Szlaga | |
| 4,793,372 A * | 12/1988 | Gauthier et al. | 137/82 |
| 5,024,203 A | 6/1991 | Hill | |
| 5,697,351 A * | 12/1997 | Schumacher | 123/574 |
| 6,640,793 B1 | 11/2003 | Kabat et al. | |
| 6,807,958 B1 * | 10/2004 | Kabat et al. | 123/574 |

OTHER PUBLICATIONS

Prior Art Toyota Motor Sales, U.S.A., Inc. Brochure, *Emission Sub Systems—Positive Crankcase Ventilation System*, pp. 1-5, date unknown.

* cited by examiner

*Primary Examiner*—Marguerite McMahon
(74) *Attorney, Agent, or Firm*—Barnes & Thornburg LLP

(57) ABSTRACT

A positive crankcase ventilation valve includes a flow restrictor movable in an orifice to vary flow of fumes from a crankcase to an intake manifold in a vehicle. The valve also includes a wax motor for moving the flow restrictor in the orifice.

23 Claims, 8 Drawing Sheets

TEMPERATURE-CONTROLLED PCV VALVE

This application claims priority under 35 U.S.C. § 119(e) to U.S. Provisional Application Ser. No. 60/541,085, filed Feb. 2, 2004, which is expressly incorporated by reference herein.

BACKGROUND

The present disclosure relates to vehicle engines, and particularly to apparatus for venting fumes present in an engine crankcase. More particularly, the present disclosure relates to a Positive Crankcase Ventilation (PCV) valve having a variable-flow orifice.

A PCV valve helps control pollution from vehicles by returning crankcase fumes to the engine's intake manifold to be mixed with incoming filtered combustion air and inducted into the cylinders of the engine. A mixture of crankcase fumes, air, and fuel is then combusted in the engine cylinders during a combustion cycle to power the vehicle engine. Thus, the crankcase fumes are burned and not just discharged into the atmosphere.

During a normal compression stroke of an engine piston in an engine cylinder providing a combustion chamber, a small amount of gases in the combustion chamber escapes past the piston and enters the crankcase. Such "blowby" gases include unburned fuel that can dilute and contaminate engine oil, cause corrosion to engine parts, and contribute to sludge build up in the engine. PCV valves cooperate to remove these blowby gases from the crankcase and combine them with the engine's normal incoming air/fuel mixture before such a mixture is burned in the engine.

SUMMARY

A positive crankcase ventilation (PCV) valve in accordance with the present disclosure includes a flow controller movable in a flow-metering orifice provided in an interior region of a valve housing to vary flow of crankcase fumes passing through the flow-metering orifice. In illustrative embodiments, means is provided in the PCV valve for moving the flow controller in the flow-metering orifice to a generally lowered wide-open throttle position during low vacuum conditions in the interior region of the valve housing when the engine throttle valve is wide open and for automatically moving the flow controller in the flow-metering orifice upwardly in the valve housing to a raised engine-idle position during high vacuum conditions in the interior region of the valve housing when the engine is idling.

In illustrative embodiments, the flow controller includes a flow restrictor constrained to move up and down in the flow-metering orifice to vary flow of crankcase gases through the orifice. The flow controller also includes a temperature-responsive lift generator arranged to urge the flow restrictor upwardly when the crankcase fumes are relatively hot and a lift reducer arranged to urge the flow restrictor downwardly when the crankcase fumes are relatively cold.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is an exploded perspective view of components included in an illustrative embodiment of a PCV valve in accordance with the present disclosure showing in sequence (from top to bottom) a shell including a valve housing formed to include an interior region and a top outlet opening into the interior region and a partition wall formed to include an orifice and fixed in an interior region of the valve housing, a large platform mover spring, a flow controller comprising (1) a "lift reducer" including a spring mount having a ring and three legs extending from the ring and a smaller restrictor mover spring; (2) a "flow restrictor" sized to move up and down in the partition wall orifice; and (3) a "lift generator" (such as a wax motor) coupled to a lower end of the flow restrictor, a movable support platform arranged to underlie the lift generator and move upwardly toward the partition wall to elevate the flow controller in the valve housing when the throttle valve is in an engine-idle position as suggested in FIGS. 5 and 6, a base that is included in the shell and is configured to mate with the valve housing and provide a bottom inlet into the valve housing, and an annular platform stop arranged on the base to engage the periphery of the movable support platform to limit movement of the movable support platform and flow controller away from the partition wall when the throttle valve is "wide open" as suggested in FIGS. 7 and 8;

FIGS. 5–8 illustrate movement of the movable support platform in the valve housing to raise the flow controller toward the partition wall to a raised "engine-idle" position whenever the engine (whether hot or cold) is idling and to lower the flow controller away from the partition wall to a lowered "wide-open throttle" position;

DETAILED DESCRIPTION

Figure 1:
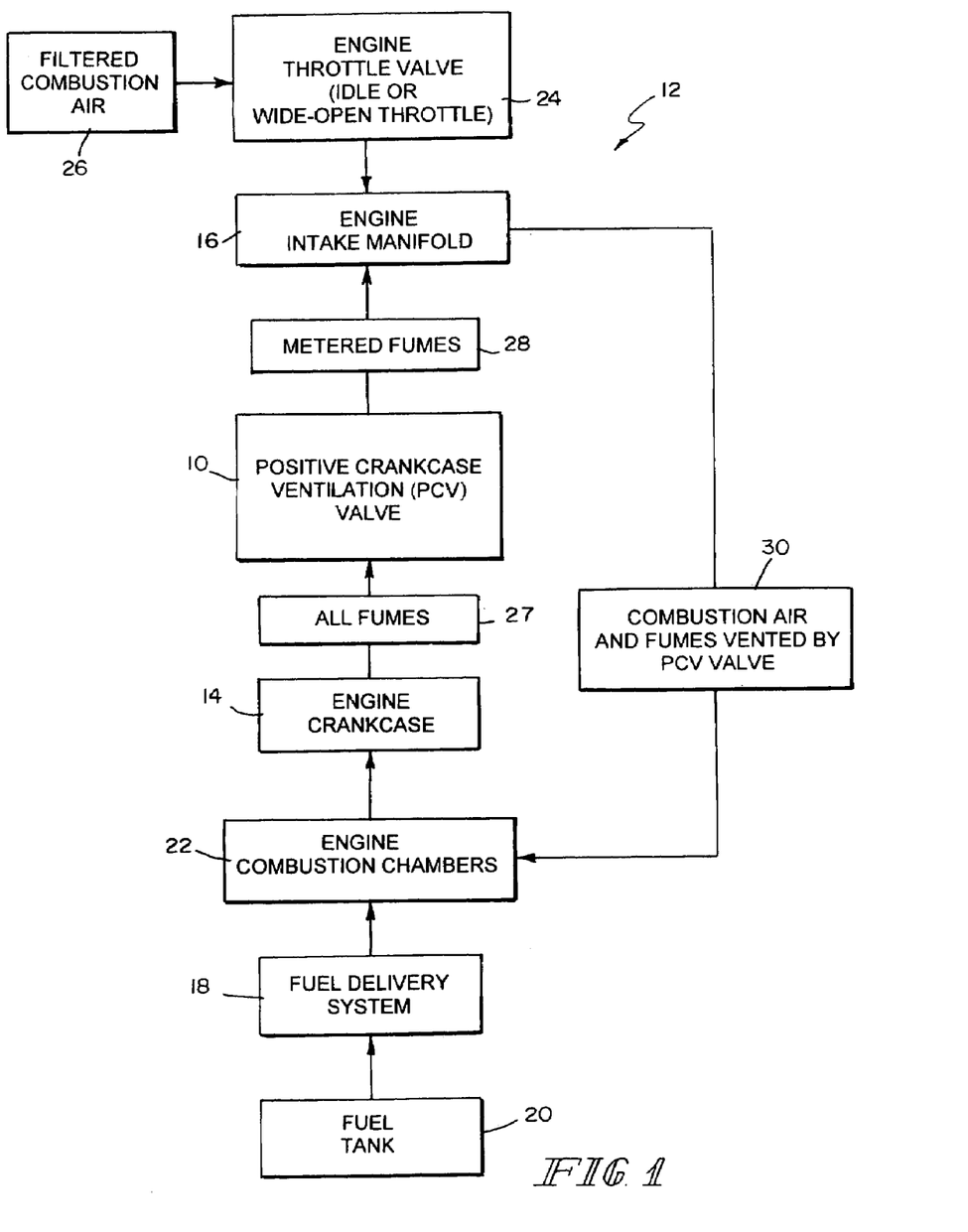
FIG. 1 is a schematic view of a vehicle engine system including a Positive Crankcase Ventilation (PCV) valve in accordance with the present disclosure.

A positive crankcase ventilation (PCV) valve 10 is included in an engine 12 shown diagrammatically in FIG. 1. PCV valve 10 controls the flow of fuel vapor fumes from engine crankcase 14 to engine intake manifold 16. The PCV valve 10 in accordance with the present disclosure is configured to (A) sense whether the engine is (1) idling or running at wide-open throttle and (2) cold (such as during engine start-up) or hot and then (B) change the flow rate of fuel vapor fumes exhausted from engine crankcase 14 and delivered to engine intake manifold 16 in accordance with predetermined performance criteria as suggested, for example, in FIGS. 5–8.

In the block diagram illustrated in FIG. 1, engine 12 also includes a fuel delivery system 18 for delivering fuel as needed from fuel tank 20 to engine combustion chambers 22. An engine throttle valve 24 is manipulated by an engine operator to regulate flow of filtered combustion air 26 into engine intake manifold 16. PCV valve 10 receives all fumes 27 discharged from engine crankcase 14 and then discharges a metered flow of fumes 28 into engine intake manifold 16 to mix with filtered combustion air 26 passing through engine intake manifold 16. A mixture 30 of filtered combustion air 26 and fumes 28 vented by PCV valve 10 is inducted from engine intake manifold 16 into engine combustion chambers 22 to mix with fuel delivered by fuel delivery system 18 to create a combustible air-fuel mixture that is burned in engine combustion chambers 22 during operation of engine 12. It is within the scope of this disclosure to use PCV valve 10 in any suitable engine system. Reference is made to U.S. Pat. No. 6,640,793 for disclosure relating to a valve assembly and method for controlling flow of gases from an engine crankcase to an engine intake manifold, which disclosure is hereby incorporated by reference herein.

Figures 2, 2A:
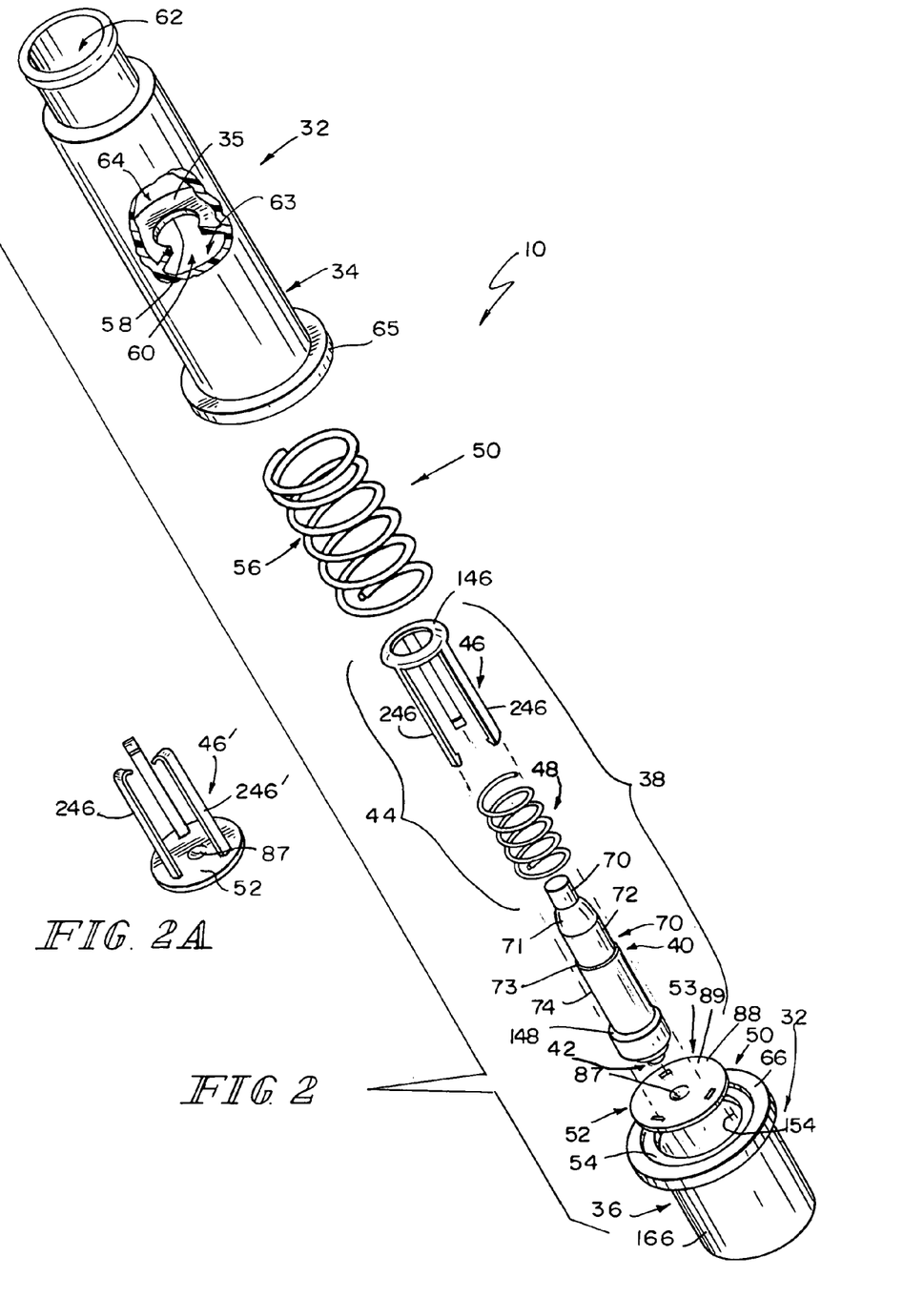
FIG. 2A is a perspective view of an alternative embodiment of a "three-legged" spring mount that cooperates with a movable support platform to form a monolithic element.

Illustrative components that may be assembled to produce PCV valve 10 are shown in FIG. 2. PCV valve 10 includes, for example, a shell 32 comprising a valve housing 34, a partition wall 35, and a base 36, a flow controller 38 comprising a flow restrictor 40, a lift generator 42, and a lift reducer 44 comprising a spring mount 46 and a restrictor mover spring 48, and a flow controller elevator 50 comprising a movable support platform 52 located under flow controller 38, a platform stop 54 appended to base 36, and a platform mover spring 56. Partition wall 35 is formed to include an orifice 58 and flow restrictor 40 moves up and down in orifice 58 to change the flow rate of crankcase fumes 27 passing through PCV valve 10 to control flow of metered fumes 28 to engine intake manifold 16.

Figure 4:
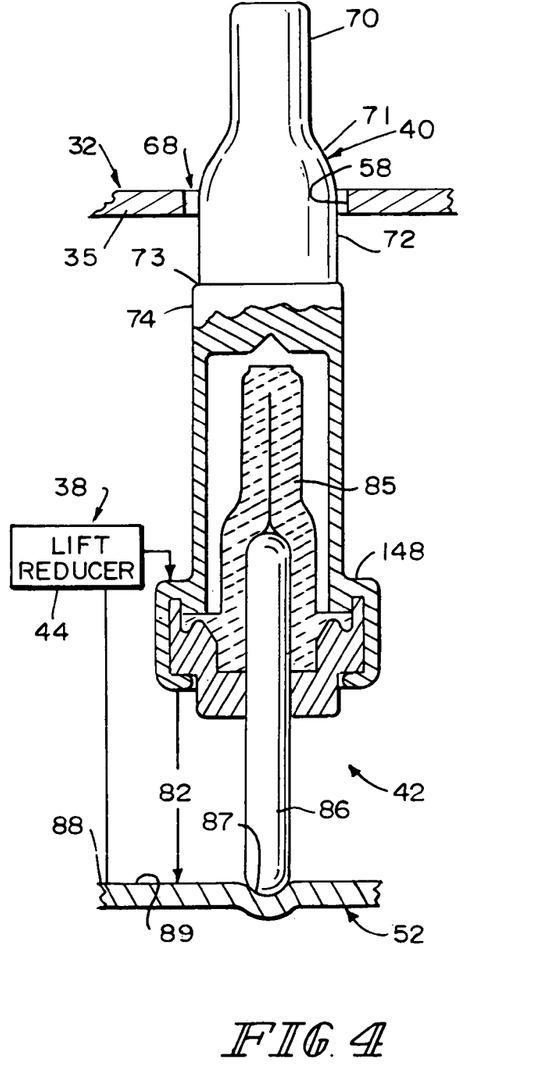
FIG. 4 is a view similar to FIG. 3 showing operation of the lift generator (e.g., wax motor) to raise the flow restrictor in the orifice to assume an extended "high-temperature" position located a greater second distance away from the movable support platform when hot fuel vapor is present in the area around the flow controller (as is normally the case when the engine is running and hot)
Figure 5:
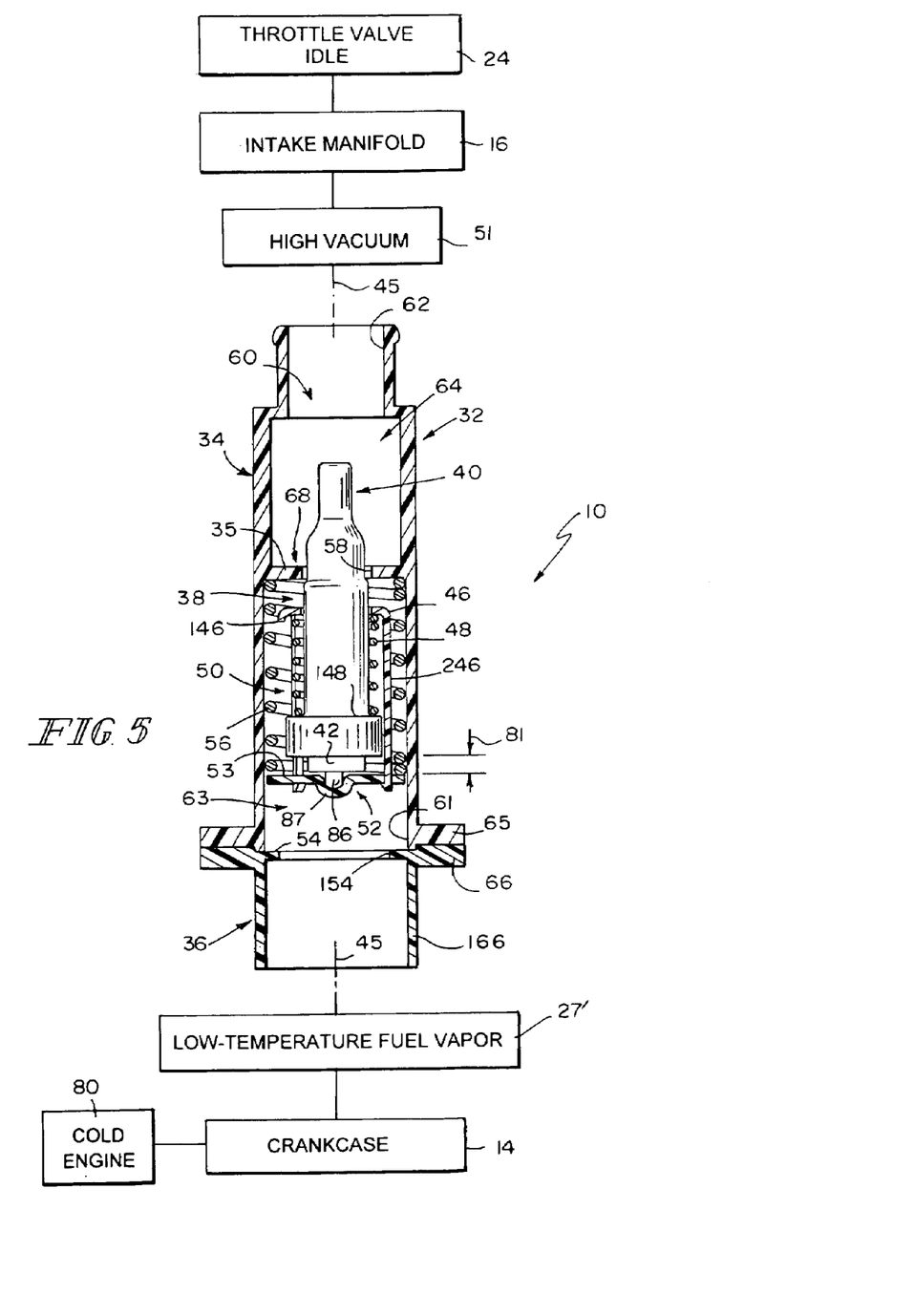
FIG. 5 is a schematic view of a portion of the vehicle engine system of FIG. 1 along with an enlarged sectional view of the PCV valve of FIG. 2 after assembly and showing the flow restrictor located in a first position in a flow-metering orifice formed in the partition wall to increase flow of low-temperature fuel vapor from the crankcase to the intake manifold when the engine is "cold" and the throttle valve is arranged to cause the engine to "idle"

As shown in FIGS. 1 and 5, valve housing 34 is formed to include an interior region 60, an inlet 61 arranged to open into interior region 60, and an outlet 62 arranged to open into interior region 60. Outlet 62 is adapted to be coupled to engine intake manifold 16. Partition wall 35 is located in interior region 60 in fixed relation to valve housing 34 to partition interior region 60. An inlet chamber 63 located between inlet 61 and partition wall 35 to communicate with inlet 61 is thus provided along with an outlet chamber 64 located between outlet 62 and partition wall 35. Fumes 27 discharged from engine crankcase 14 into inlet chamber 63 pass through orifice 58 formed in partition wall 35 into outlet chamber 64. As disclosed herein, flow restrictor 40 is moved up and down in orifice 58 to define a variable flow-metering channel 68 (shown, for example, in FIGS. 3 and 4) through which crankcase fumes 27 pass and are metered to reach outlet chamber 64.

Valve housing 34 also includes a lower flange 65 sized and located to mate with an upper flange 66 in base 36 (using any suitable coupling method) to form shell 32. In the illustrated embodiment, valve housing 34 and partition wall 35 are molded using a plastics material to form a monolithic element.

Flow controller 38 includes flow restrictor 40 and lift control means provided, for example, by lift generator 42 and lift reducer 44, for changing the position of flow restrictor 40 in orifice 58 as a function of the temperature of crankcase fumes 27 extant in inlet chamber 63 of valve housing 34. In the present disclosure, means is also provided for changing the position of flow controller 38 (including its flow restrictor 40) in orifice 58 as a function of the pressure of crankcase fumes 27 extant in inlet chamber 63. In particular, flow controller 38 moves upwardly during "high vacuum" conditions in inlet chamber 63 caused by idling engine 12 and downwardly during relatively "low vacuum" conditions in inlet chamber 63 caused by operating engine 12 in a wide-open throttle mode.

Figure 6:
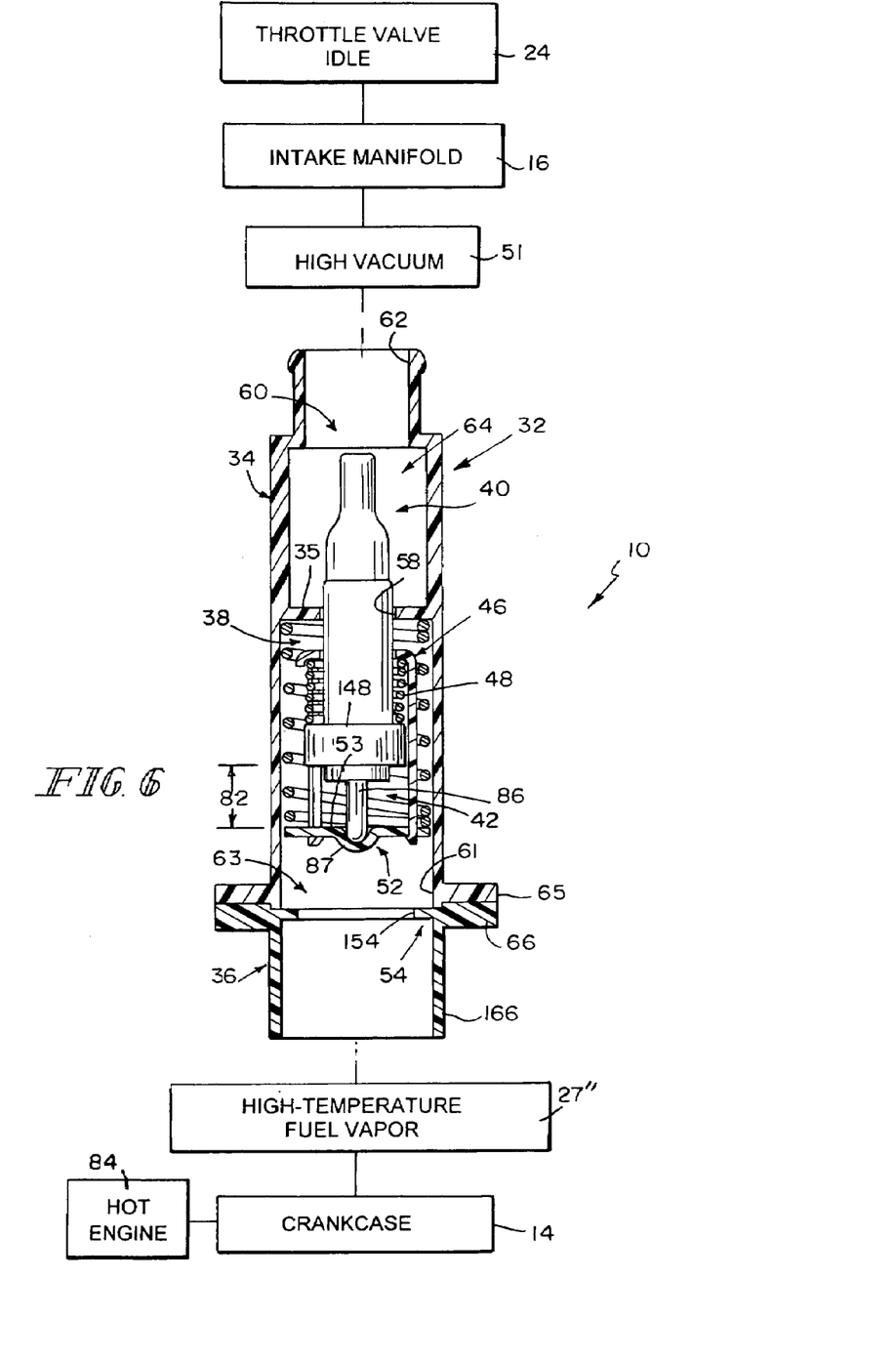
FIG. 6 is an illustration similar to FIG. 5 showing the flow restrictor located in a second position in the flow-metering orifice formed in the partition wall to decrease flow of high-temperature fuel vapor from the crankcase to the intake manifold when the engine is "hot" and the throttle valve is arranged to cause the engine to idle.
Figure 7:
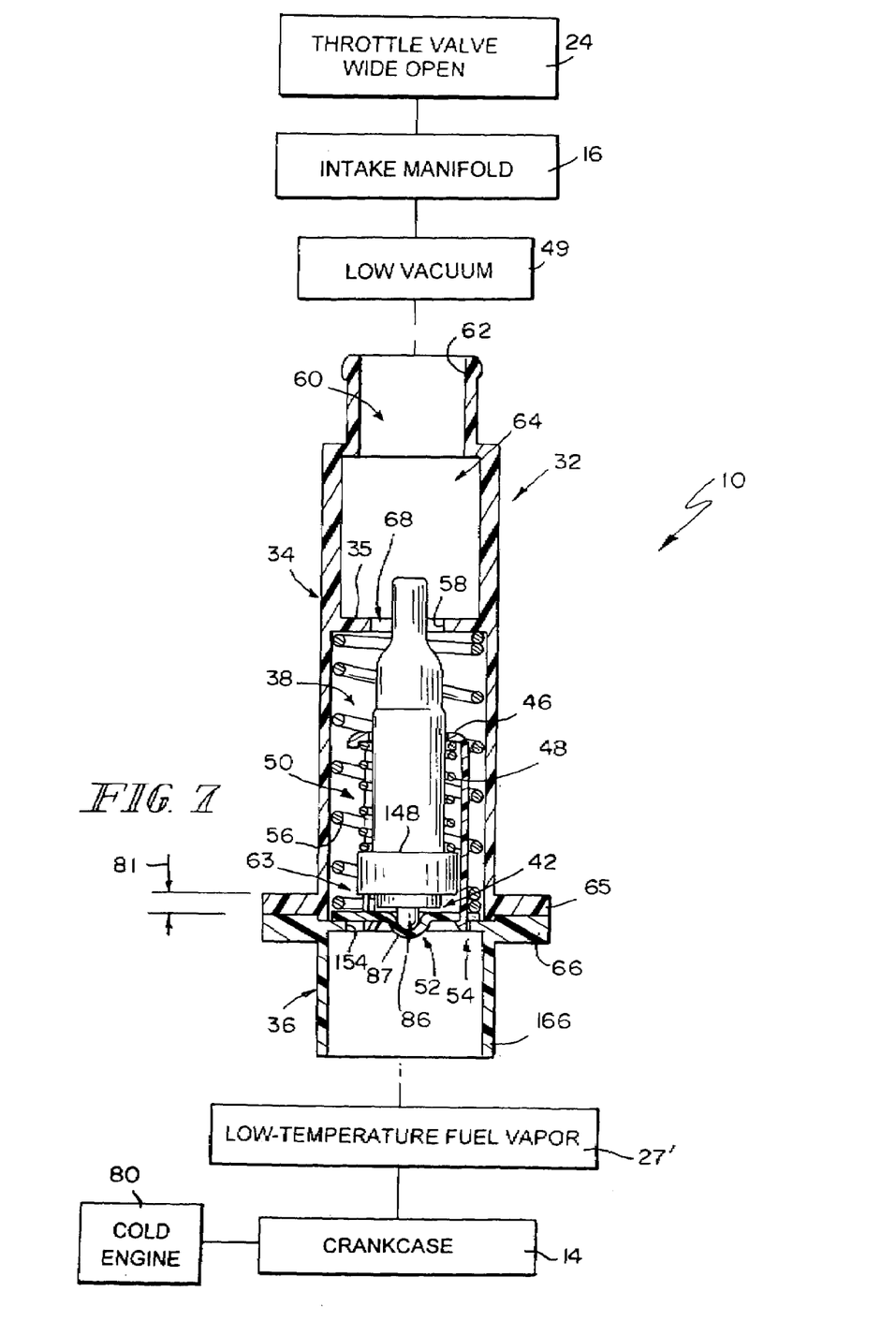
FIG. 7 is an illustration similar to FIGS. 5 and 6 showing the flow restrictor located in third position in the flow-metering orifice formed in the partition wall to increase flow of low-temperature fuel vapor from the crankcase to the intake manifold when the engine is cold and the throttle valve is "wide open"
Figure 8:
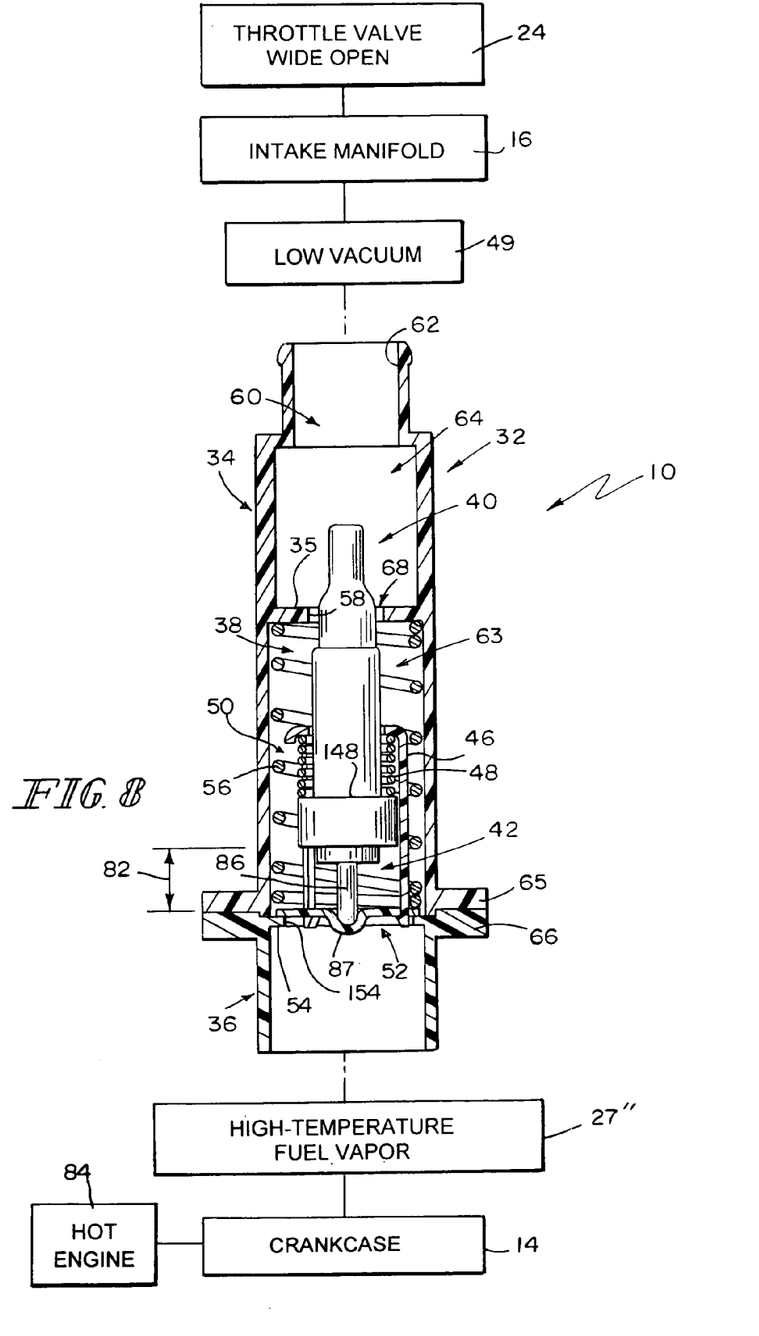
FIG. 8 is an illustration similar to FIGS. 5–7 showing the flow restrictor located in a fourth position in the flow-metering orifice formed in the partition wall to decrease flow of high-temperature fuel vapor from the crankcase to the intake manifold when the engine is hot and the throttle valve is wide open.

Flow controller 38 is carried on a "vacuum-sensitive" movable support platform 52 as movable support platform 52 moves up and down in inlet chamber 63 between a raised "engine-idle" position shown, for example, in FIGS. 5 and 6 and a lowered "wide-open throttle" position shown, for example, in FIGS. 7 and 8. When engine throttle valve 24 is arranged to idle engine 12, a high vacuum (in excess of a predetermined minimum vacuum) is applied via engine intake manifold 16 to interior region 60 of valve housing 34. A suction force generated by the high vacuum 51 acts to move movable support platform 52 upwardly against a downward biasing force applied by platform mover 56 to cause movable support platform 52 to move to assume the raised engine-idle position as shown, for example, in FIGS. 5 and 6. This vacuum-generated suction force is applied to a top side 53 of movable support platform 52. In contrast, when engine throttle valve 24 is moved to a wide-open position, a relatively low vacuum 49 is applied via engine intake manifold 16 to interior region 60 of valve housing 34 and this low vacuum 49 does not generate a sufficient suction force to overcome the downward biasing force applied by platform mover 56 to move movable support platform 52 away from spring-biased engagement with platform stop 54 as shown, for example, in FIGS. 7 and 8.

Flow controller 38 is carried on movable support platform 52 as movable support platform 52 moves in inlet chamber 63 formed in valve housing 34 between the raised engine-idle position shown in FIGS. 5 and 6 and the lowered wide-open throttle position shown in FIGS. 7 and 8. Thus, movable support platform 52 and platform mover 56 cooperate to form means for changing the elevation of flow controller 38 (and its flow restrictor 40) in inlet chamber 63 relative to partition wall 35 and orifice 58 formed therein so as to change the position of flow restrictor 40 in orifice 58 as a function of the magnitude of vacuum (i.e., negative pressure) extant in inlet chamber 63.

Partition wall 35 includes an interior border edge defining orifice 58 and providing a first flow-metering surface bordering orifice 58. Flow restrictor 40 included in flow controller 38 extends into orifice 58 and provides a second flow-metering surface (on the exterior of flow restrictor 40) which cooperates with the opposing first flow-metering surface bordering orifice 58 to define a variable flow-metering channel 68 therebetween. The effective size of flow-metering channel 68 is varied by up-and-down movement of flow restrictor 40 in orifice 58 owing, in part, to the varying cross-sectional dimensions of flow restrictor 40 shown in the drawings and described below.

Figure 3:
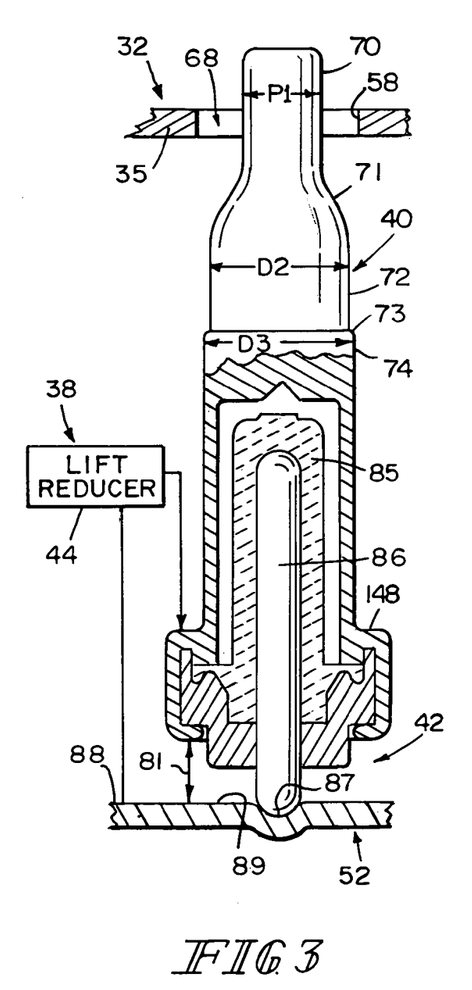
FIG. 3 is an enlarged view of the assembled flow controller of FIG. 2, with portions broken away, showing the flow restrictor extending into the partition wall orifice and an unactuated lift generator (in the form of a wax motor) below the flow restrictor and above the movable support plate and diagrammatically showing a lift reducer configured to move the flow restrictor in the orifice normally to a retracted "low-temperature" position a first distance above the movable support platform when cold air or fuel vapor is present in the area around the flow controller (as is normally the case during cold engine starting)

Flow restrictor 40 includes a plurality of differently sized control portions which are positionable in orifice 58 to vary flow through flow-metering channel 68, depending upon which control portion is positioned in orifice 58 as shown, for example, in FIGS. 3 and 4. Illustratively, flow restrictor 40 includes first, second, and third cylindrical control portions 70, 72, 74 and first and second transition control portions 71, 73 which have a generally frustoconical shape. Control portions 71–75 are aligned along axis 45. First transition control portion 71 interconnects first and second cylindrical control portions 70, 72. Second transition control portion 73 interconnects second and third cylindrical control portions 72, 74. First cylindrical control portion 70 has a first diameter D1. Second cylindrical control portion 72 has a second diameter D2 larger than first diameter D1. Third cylindrical control portion 74 has a third diameter D3 larger than second diameter D2. First transition control portion 71 has a fourth diameter which increases as control portion 71 extends axially from first cylindrical control portion 70 to second cylindrical control portion 92. Second transition control portion 73 has a fifth diameter which increases as control portion 73 extends axially from second cylindrical control portion 72 to third cylindrical control portion 74.

As shown, for example, in FIGS. 3 and 4, lift generator 42 of flow controller 38 provides temperature-responsive means for moving flow restrictor 40 in orifice 58 and relative to movable support platform 52 to vary the size of flow-metering channel 68 from a retracted "low-temperature" position shown in FIG. 3 to an extended "high-temperature" position shown in FIG. 4. In the retracted low-temperature position, flow restrictor 40 is located a first distance 81 away from underlying movable support platform 52 when crankcase fumes 27' extant in inlet chamber 63 have a first temperature associated with a "cold-start" condition 80 of engine 12 as suggested in FIGS. 3, 5, and 7. In the extended high-temperature position, flow restrictor 40 is located a greater second distance 82 away from movable support platform 52 when crankcase fumes 27" extant in inlet chamber 63 have at least a second temperature that is greater than the first temperature and is associated with a "hot-run" condition 84 of engine 12.

In the illustrated embodiment, lift generator 42 is a wax motor coupled to flow restrictor 40 and arranged to lie between flow restrictor 40 and movable support platform 52 as suggested in FIGS. 3 and 4. The wax motor includes a piston 86 mounted for movement relative to flow restrictor 40. Movable support platform 52 is formed to have a central piston-receiving cavity 87 having an opening facing upwardly toward the wax motor and receiving a lower end of piston 86 therein. Movable support platform 52 further includes a peripheral portion 88 surrounding piston-receiving cavity 87 and engaging a lower end of platform mover 56 as suggested in FIGS. 2 and 5. Movable support platform 52 also includes an annular portion 89 located between peripheral portion 88 and piston-receiving cavity 87 to surround piston-receiving cavity 87.

Also in the illustrated embodiment, the wax motor defining lift generator 42 includes a temperature-responsive expansion agent 85 provided in a cavity formed in flow restrictor 40 and coupled to piston 86 as suggested, for example, in FIGS. 3 and 4. Expansion agent 85 is configured to expand to cause relative movement between piston 86 and flow restrictor 40 to "lift" flow restrictor 40 in inlet chamber 63 from the retracted low-temperature position shown in FIGS. 3, 5, and 7 to the extended high-temperature position shown in FIGS. 4, 6, and 8 whenever low-temperature crankcase fumes 27' are present in inlet chamber 63 of valve housing 34. These low-temperature crankcase fumes are present normally during cold-starting of engine 12. Expansion agent 85 is also configured to contract to cause relative movement between piston 86 and flow restrictor 40 to "lower" flow restrictor 40 in inlet chamber 63 from the extended high-temperature position shown in FIGS. 4, 6, and 8 to the retracted low-temperature position shown in FIGS. 3, 5, and 7 whenever high-temperature crankcase fumes 27" are present in inlet chamber 63 of valve housing 34. These high-temperature crankcase fumes 27" are present normally after engine 12 has been running for a while and is hot.

Lift reducer 44 of flow controller 38 provides return means for moving flow restrictor 40 in orifice 58 and relative to movable support platform 52 to the retracted low-temperature position in response to lowering of the temperature of crankcase fumes 27' extant in inlet chamber 63 to a first temperature associated with a cold-start condition 80 of engine 12 as shown, for example, in FIGS. 5 and 7. In the illustrated embodiment, lift reducer 44 includes spring mount 46 and restrictor mover spring 48 as shown in FIGS. 2 and 5. Spring mount 46 is coupled to movable support platform 52 for up-and-down movement therewith. Restrictor mover spring 48 is a compression spring having an upper end arranged to engage spring mount 46 and a lower end arranged to engage a flange 148 provided on flow restrictor 40 normally to urge flow restrictor 40 in a downward direction toward movable support platform 52.

As shown, for example, in FIGS. 2 and 5, spring mount 46 includes a ring 146 arranged to lie between partition wall 35 and movable support platform 52 and surround a portion of flow restrictor 40. Spring mount 46 also includes three legs 246 appended to ring 146 and coupled to movable support platform 52 to retain ring 146 in a fixed position relative to movable support platform 52. In the illustrated embodiment, lower ends of legs 246 pass through apertures formed in movable support platform 52 to lie at a junction between peripheral portion 88 and annular portion 89 of movable support platform 52. A snap-connection, welded connection, or other suitable coupling can be used to couple legs 246 to movable support platform 52 to establish spring mount 46.

In an alternative embodiment, spring mount 46' includes three legs 246' as shown in FIG. 2A. A lower end of each leg 246' is coupled to movable support platform 52. An upper end of each leg 246' is arranged to extend toward partition wall 35 and is, for example, hook-shaped and coupled to an upper end of restrictor mover spring 48 to load restrictor mover spring 48 against flange 148 of flow restrictor 40. In this embodiment, this three-legged spring mount 46' cooperates with movable support platform 52 to form a monolithic element.

In operation, lift generator 42 of flow controller 38 is configured to provide lift means for moving flow restrictor 40 in orifice 58 and relative to movable support platform 52 independent of the location of movable support platform 52 as suggested, for example, in FIGS. 5–8. Lift generator 42 is interposed between movable support platform 52 and flow restrictor 40. Platform mover 56 is configured and arranged to allow movement of flow restrictor 40 under a motive force provided by lift generator 42 relative to movable support platform 52 and independent of the location of movable support platform 52 in inlet chamber 63.

Movable support platform 52 is mounted for up-and-down movement in inlet chamber 63 in a space provided between partition wall 35 and platform stop 54 as shown, for example, in FIGS. 6 and 7. Platform mover 56 is located in that space in inlet chamber 63 and is a coiled compression spring in the illustrated embodiment. Platform mover 56 is arranged normally to yieldably urge movable support platform 52 downwardly in that space to a lowered wide-open throttle position as shown, for example, in FIGS. 7 and 8. Movable support platform 52 is configured to move upwardly in that space (carrying flow controller 38 with it) toward partition wall 35 against a downward biasing force applied by platform mover 56 to assume a raised engine-idle position above platform stop 54 upon exposure of top side 53 of movable support platform 52 toward partition wall 35 to a vacuum in excess of a predetermined minimum vacuum during idling of engine 12 associated with PCV valve 10.

An upper end of platform mover "spring" 56 engages an underside of partition wall 35 and a lower end of platform mover spring 56 engages peripheral portion 88 of movable support platform 52. As suggested in FIGS. 2 and 5, platform mover spring 56 is configured to wind in a spiral maimer around flow restrictor 40. Restrictor mover spring 48 is configured to wind around flow restrictor 40 and lie in an interior region formed in platform mover spring 56. Restrictor mover spring 48 is also arranged to lie in a space defined between platform mover spring 56 and flow restrictor 40 as suggested in FIG. 5.

Platform mover spring 56 has a predetermined spring force to cause platform mover spring 56 to yield to allow movement of movable support platform 52 from the lowered wide-open throttle position to the raised engine-idle position closer to partition wall 35 as suggested in FIGS. 5 and 6. Such movement elevates flow controller 38 in interior region 60 of valve housing 34 relative to platform stop 54 upon exposure of top side 53 of movable support platform 52 to a vacuum in excess of a predetermined minimum vacuum during idling of engine 12.

Base 36 cooperates with valve housing 34 to define shell 32 as shown, for example, in FIGS. 2 and 5. Base 36 includes an upper flange 66 an a sleeve 166 arranged to extend downwardly from upper flange 66 and provide a passageway for conducting fumes 27 from engine crankcase 14 to valve housing 34 through an aperture 154 defined by platform stop 54 as suggested in FIGS. 5–8. Platform stop 54 is an annular flange arranged to extend radially inwardly from annular flange 66 as shown, for example, in FIGS. 2 and 5. Platform stop 54 is thus able to stop and mate with peripheral portion 88 of movable support platform 52 to limit movement of movable support platform 52 away from partition wall 35. It is within the scope of this disclosure to relocate platform stop 54 to a lowermost end of sleeve 166 or any suitable location between flange 66 and that lowermost end of sleeve 66.

Figure 9:
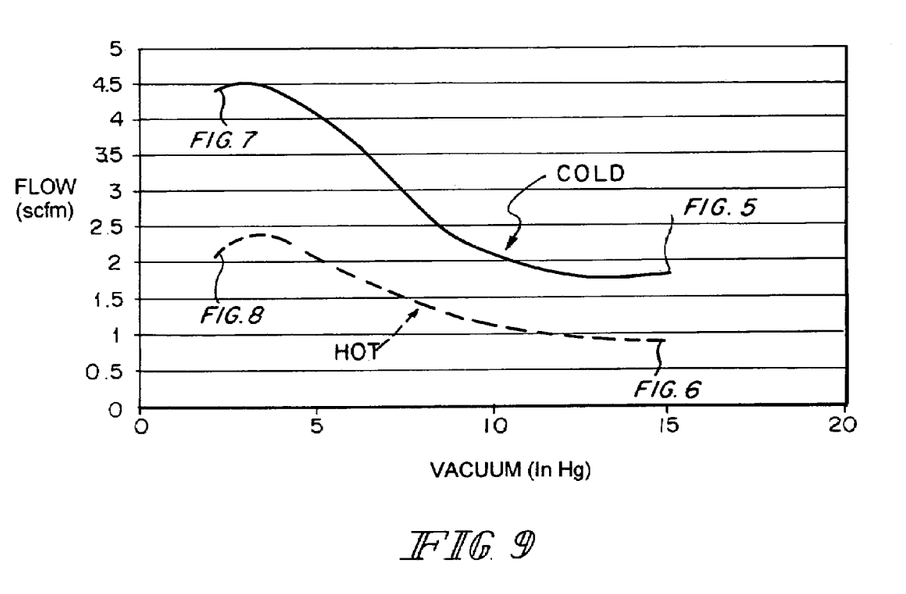
FIG. 9 is a graph showing a first plot of intended flow of fuel vapor through the PCV valve as a function of vacuum at a discharge outlet of the PCV valve when the engine is cold and showing a second "flow vs. vacuum" plot when the engine is hot.

As suggested in FIG. 9, under cold-engine conditions 80, PCV valve 10 operates to generate a higher flow curve to effect maximum crankcase ventilation during initial engine warm-up so as to minimize or otherwise prevent sludging. Such higher flow rates are also expected to improve anti-icing performance. When engine 10 gets hot, contaminants in crankcase 14 (e.g., water, combustion byproducts, etc.) are "boiled off" and an oil mist is developed. Under these conditions, PCV valve 10 compensates for the higher temperature and generates the lower flow curve. This is expected to improve oil consumption due to oil pullover through the crankcase vent system.

PCV valve 10 is responsive to negative pressure developed in engine intake manifold 16 to decrease flow of crankcase fumes 27 to engine intake manifold 16 when engine 12 is idling (which results in relatively low blow-by flow in engine 12 causing relatively high negative pressure, or relatively high suction, from engine intake manifold 18). This negative pressure also acts to increase flow of crankcase fumes 27 to engine intake manifold 16 when engine 12 has a wide-open engine throttle valve 24 (which results in relatively high blow-by flow in engine 12, causing relatively low negative pressure, or relatively low suction, from engine intake manifold 16). PCV valve 10 is also responsive to temperature to inhibit formation of engine oil sludge and engine icing when engine 12 is relatively cold and to inhibit burning of engine oil vapor in engine 12 when engine 12 is relatively hot.

The invention claimed is:

1. A positive crankcase ventilation valve for use with a vehicle engine having a throttle valve movable between an idle position and a wide-open position, the valve comprising a shell including a valve housing formed to include an interior region, an inlet arranged to open into the interior region and adapted to be coupled to a crankcase of a vehicle, and an outlet arranged to open into the interior region and adapted to be coupled to an intake manifold of the vehicle, the shell further including a partition wall located in the interior region in fixed relation to the valve housing to partition the interior region to define an inlet chamber located between the inlet and the partition wall to communicate with the inlet and an outlet chamber located between the outlet and the partition wall to communicate with the outlet, the partition wall including an interior border edge defining an orifice and providing a first flow-metering surface bordering the orifice, a flow controller elevator including a platform stop located in the inlet chamber in a fixed position below the partition wall, a movable support platform mounted for up-and-down movement in the inlet chamber in a space provided between the partition wall and the platform stop, and a platform mover located in the inlet chamber and arranged normally to yieldably urge the movable support platform downwardly in the space to a lowered wide-open throttle position engaging the platform stop, the movable support platform being configured to move upwardly in the space toward the partition wall against a downward biasing force applied by the platform mover to assume a raised engine-idle position above the platform stop upon exposure of a top side of the movable support platform facing toward the partition wall to a vacuum in excess of a predetermined minimum vacuum during idling of an engine associated with the valve, and a flow controller carried on the movable support platform as the movable support platform moves in the valve housing between the lowered wide-open throttle position and the raised engine-idle position, the flow controller including a flow restrictor extending into the orifice and providing a second flow-metering surface which cooperates with the first flow-metering surface to define a variable flow-metering channel therebetween during movement of the movable support platform between the lowered wide-open throttle position and the raised engine-idle position, the second flow-metering surface being moved in relation to the first flow-metering surface in response to movement of the flow restrictor in the orifice relative to the partition wall to vary the size of the flow-metering channel, the flow controller further including temperature-responsive means for moving the flow restrictor in the orifice and relative to the movable support platform to vary the size of flow-metering channel from a retracted low-temperature position located a first distance away from the movable support platform when fumes extant in the inlet chamber have a first temperature associated with a cold-start condition of the engine to an extended high-temperature position located a greater second distance away from the movable support platform when fumes extant in the inlet chamber have at least a second temperature that is greater than the first temperature and is associated with a hot-run condition of the engine.

2. The valve of claim 1, wherein the flow controller further includes return means for moving the flow restrictor in the orifice and relative to the movable support platform to the retracted low-temperature position in response to lowering of the temperature of fumes extant in the inlet temperature to about the first temperature.

3. The valve of claim 2, wherein the return means includes a spring mount coupled to the movable support platform for up-and-down movement therewith and a compression spring having an upper end arranged to engage the spring mount and a lower end arranged to engage the flow restrictor normally to urge the flow restrictor in a direction toward the movable support platform.

4. The valve of claim 3, wherein the spring mount includes a ring arranged to lie between the partition wall and the movable support platform and surround a portion of the flow restrictor and at least one leg appended to the ring and coupled to the movable support platform to retain the ring in a fixed position relative to the movable support platform, the compression spring is arranged to lie between the ring and the movable support platform to wind around a portion of the flow restrictor, and the upper end of the spring engages the ring.

5. The valve of claim 3, wherein the spring mount includes at least one leg having a lower end coupled to the movable support platform to move therewith and an upper end arranged to extend toward the partition wall and coupled to the upper end of the compression spring to load the compression spring against the flow restrictor.

6. The valve of claim 1, wherein the flow restrictor is arranged to lie in spaced-apart relation to the valve housing to define a space therebetween and the platform mover is located in the space.

7. The valve of claim 6, wherein the platform mover is a first compression spring configured to wind around the flow restrictor.

8. The valve of claim 7, wherein the temperature-responsive means includes a second compression spring configured to wind around the flow restrictor and lie in an interior region formed in the first compression spring and lie in a space provided between the first compression spring and the flow restrictor.

9. The valve of claim 6, wherein the temperature-responsive means includes a lift reducer located in the space and the lift reducer includes a spring mount coupled to the movable support platform to move therewith and a spring coupled to the spring mount and to the flow restrictor and configured normally to urge the flow restrictor in a direction toward the movable support platform.

10. The valve of claim 9, wherein the lift reducer is positioned to lie between the platform mover and the flow restrictor.

11. The valve of claim 1, wherein the temperature-responsive means includes a wax motor coupled to the flow restrictor and arranged to lie between the flow restrictor and the movable support platform, the wax motor includes a piston mounted for movement relative to the flow restrictor, and the movable support platform is formed to include a piston-receiving cavity having an opening facing upwardly toward the wax motor and receiving a lower end of the piston therein.

12. The valve of claim 11, wherein the movable support platform further includes a peripheral portion surrounding the piston-receiving cavity and engaging a lower end of the platform mover.

13. The valve of claim 12, wherein the movable support platform further includes an annular portion located between the peripheral portion and the piston-receiving cavity and wherein the flow controller includes a spring mount coupled to the annular portion of the movable support platform and located between the partition wall and the movable support platform and a spring coupled to the spring mount and to the flow restrictor and configured normally to urge the flow restrictor in a direction toward the movable support platform.

14. A positive crankcase ventilation valve comprising
a shell including a valve housing formed to include an inlet, outlet, and interior region communicating with the inlet and the outlet, the shell further including a partition wall coupled to the valve housing to lie in the interior region and formed to include an orifice,
a movable support platform mounted for up-and-down movement in the interior region of the valve housing in directions toward and away from the partition wall, and
a flow controller including a flow restrictor extending into the orifice to define a variable flow-metering channel therebetween and a lift generator arranged to engage the movable support platform and interposed between the movable support platform and the flow restrictor, wherein the lift generator is configured to provide lift means for moving the flow restrictor in the orifice and relative to the movable support platform independent of the location of the movable support platform in the interior region of the valve housing and relative to the partition wall.

15. The valve of claim 14, further comprising a platform stop located in a fixed position in the interior region of the valve housing, the platform stop lying in spaced-apart relation to the partition wall to define a space therebetween containing the movable support platform, and a platform mover located in the space and configured normally to urge the movable support platform to a lowered position engaging the platform stop.

16. The valve of claim 15, wherein the valve housing includes an inner wall surrounding the flow controller and the movable support platform and the platform stop is an annular flange having an outer periphery cantilevered to the shell to extend radially inwardly relative to the inner wall to provide an annular top surface facing upwardly toward the partition wall and arranged to engage a peripheral portion of the movable platform support to establish the lowered position of the movable platform support.

17. The valve of claim 15, wherein the platform mover is a coiled compression spring having an upper end engaging the partition wall and a lower end engaging the movable support platform and the coiled compression spring is arranged to wind in a spiral manner around and about the flow controller to allow movement of the flow restrictor under a motive force provided by the lift generator relative to the movable support platform and independent of the location of the movable support platform in the space.

18. The valve of claim 15, wherein the platform mover is a coiled compression spring having a predetermined spring force to cause the coiled compression spring to yield to allow movement of the movable support platform from the lowered position to a raised position located closer to the partition wall to elevate the flow controller in the interior region of the valve housing relative to the platform stop upon exposure of the movable support platform to a vacuum in excess of a predetermined minimum vacuum during idling of an engine associated with the valve.

19. The valve of claim 14, wherein the lift generator is coupled to the movable support platform to move therewith in the interior region of the valve housing.

20. The valve of claim 19, wherein the flow controller further includes a lift reducer providing means for lowering the flow restrictor in the interior region to assume a retracted low-temperature position located a first distance away from the movable support platform when fumes extant in the interior region have a first temperature associated with a cold-start condition of the engine and the lift means applies an upward motive force to the flow restrictor that is greater than an opposing downward motive force applied to the flow restrictor by the lift reducer to raise the flow restrictor to assume an extended high-temperature position located a greater second distance away from the movable support platform when fumes extant in the interior region have at least a second temperature that is greater than the first temperature and is associated with a hot-run condition of the engine.

21. The valve of claim 19, wherein the lift generator is interposed between the flow restrictor and the movable support platform and the lift generator comprises a piston and a temperature-responsive expansion agent providing means for raising the piston relative to the movable support platform to raise the flow restrictor in the orifice to assume an extended high-temperature position when fumes extant in the interior region have a temperature that is associated with a hot-run condition of the engine to vary the size of the variable flow-metering channel in response to increasing temperature of fumes extant in the interior region of the valve housing.

22. A positive crankcase ventilation valve comprising
a shell including a valve housing formed to include an inlet, outlet, and interior region communicating with the inlet and the outlet, the shell further including a partition wall arranged to partition the interior region to form an inlet chamber communicating with the inlet and an outlet chamber communicating with the outlet, the partition wall being formed to include an orifice,
a flow restrictor movable in the orifice to define a variable flow-metering channel between the flow restrictor and the partition wall,
a wax motor located under the flow restrictor, and
platform means for raising and lowering the flow restrictor and the wax motor in the inlet chamber to vary an effective size of the variable flow-metering channel in response to vacuum conditions extant in the inlet and outlet chambers so that the wax motor is positioned to lie a first distance away from the partition wall when pressure extant in the inlet and outlet chambers is below a first predetermined negative pressure to create a high vacuum condition in the inlet chamber and the wax motor is positioned to lie a greater second distance away from the partition wall when pressure extant in the inlet and outlet chambers is above a second predetermined negative pressure that is less than the first negative pressure to create a low vacuum condition in the inlet chamber.

23. The valve of claim 22, further comprising a lift reducer coupled to the flow restrictor and the platform means and configured yieldably to urge the flow restrictor and wax motor in a downward direction toward a movable support platform included in the platform means.

* * * * *